July 17, 1951

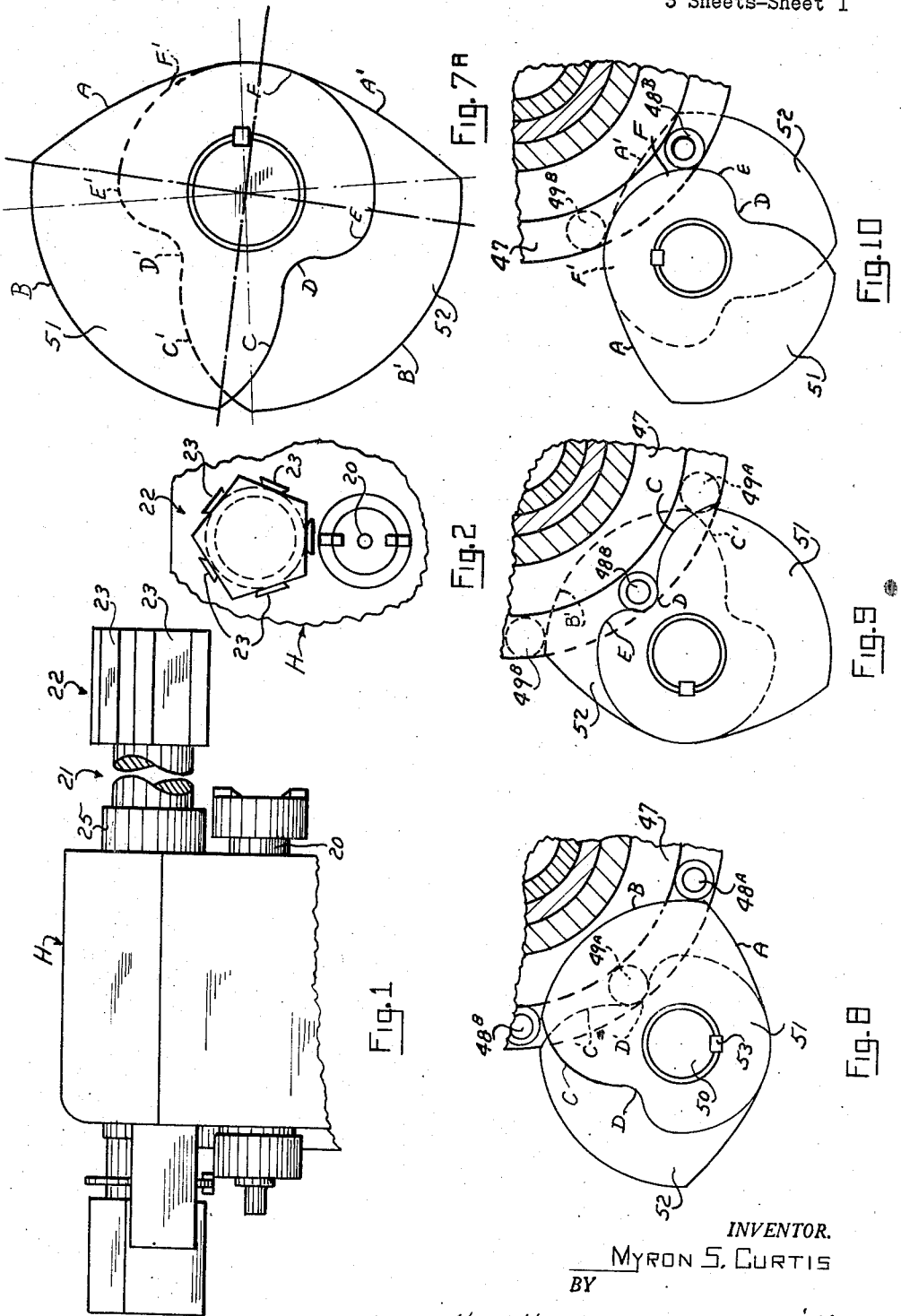

M. S. CURTIS 2,560,686

MACHINE TOOL

Filed July 18, 1946

INVENTOR.
MYRON S. CURTIS
BY
Kwis, Hudson, Boughton + Williams
ATTORNEYS

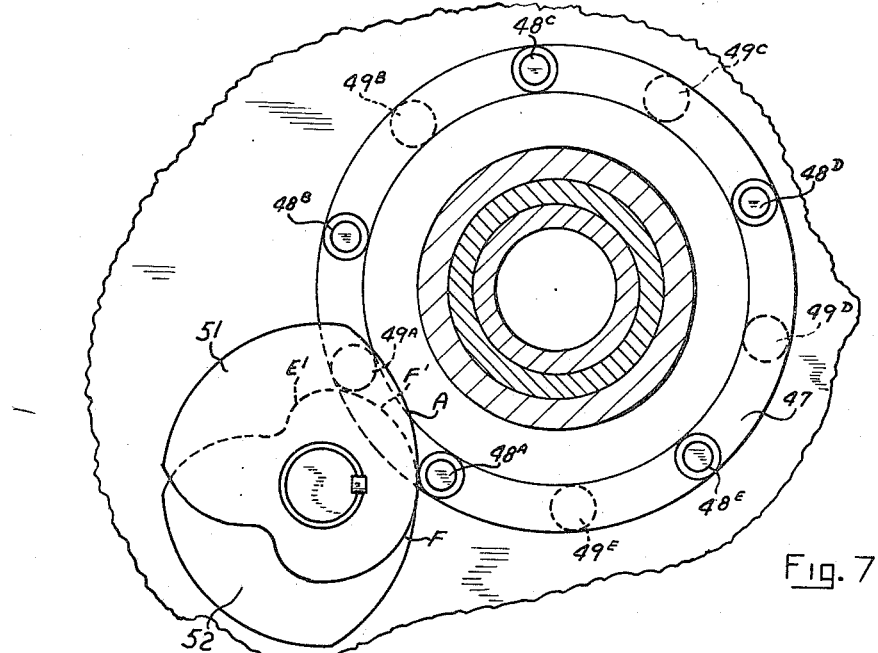
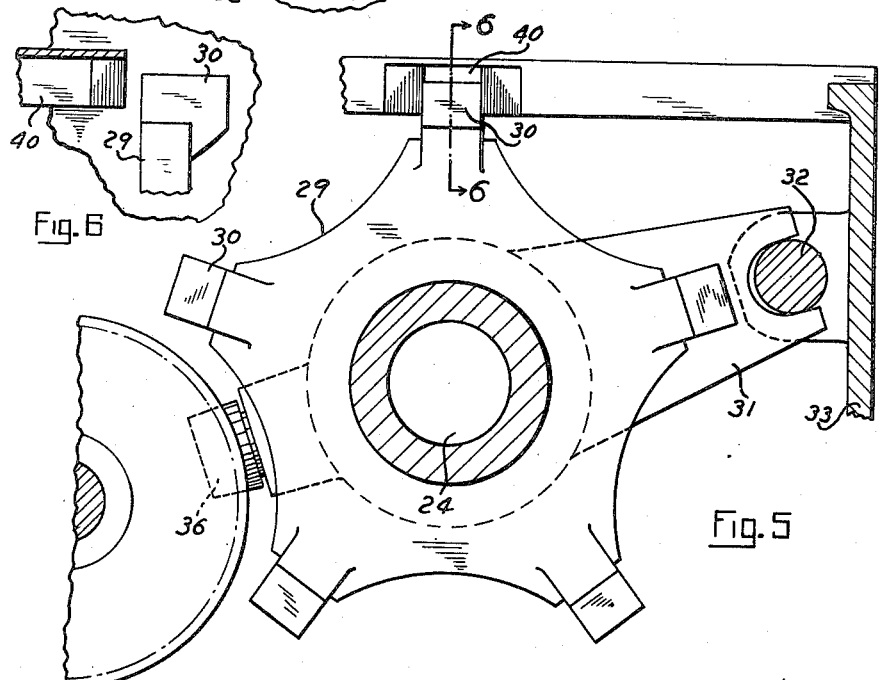

Patented July 17, 1951

2,560,686

UNITED STATES PATENT OFFICE 2,560,686

MACHINE TOOL

Myron S. Curtis, Cleveland, Ohio, assignor to The Warner & Swasey Company, Cleveland, Ohio, a corporation of Ohio Application July 18, 1946, Serial No. 684,594

11 Claims. (Cl. 29—50)

This invention relates to a machine tool and has as its principal object the provision of an improved means for indexing a movable member thereof.

Another object of the invention is to provide an improved machine tool having an indexible member with improved means for indexing the said member and to lock it in its indexed position.

A further object of the invention is to provide an improved indexing mechanism, for the tool support of a machine tool, such that the indexing is accomplished by a plurality of rotatable cams successively and conjointly cooperating with members on the tool support to index the latter and positively retain it in its indexed position.

A still further object of the invention is to provide an improved indexing mechanism for a machine tool, the said mechanism including a pair of rotatable cams cooperating with a rotatable disk, which is in turn connected with the member to be indexed; the said cams being so positioned and shaped that one cam rotatively drives the disk at a certain speed, while the other cam regulates or restrains the disk from rotation which is independent from that imparted by the driving cam, the driving and restraining functions of the cams alternating, so that the indexing motion is positively controlled to prevent unbalanced distribution of weight on the indexible member from interfering with the accurate indexing thereof.

Other objects and advantages of the invention will become apparent from the following detailed description when taken in conjunction with the accompanying drawings illustrating a preferred embodiment of the invention and wherein:

Fig. 1 is a partial front elevational view of a machine tool illustrating the relative positions of the tool (or work) holding spindle and of the indexible and reciprocable tool (or work) support;

Fig. 2 is a fragmentary end elevational view of the structure illustrated in Fig. 1, the view being taken from the right of Fig. 1;

Fig. 5 is a sectional view through a portion of the apparatus illustrated in Fig. 1 and looking from the right of Fig. 3;

Fig. 6 is a fragmentary sectional view taken substantially on the line 6—6 of Fig. 5 and showing one of the guiding lugs in elevation;

Fig. 7 is an enlarged sectional view taken substantially on the line 7—7 of Fig. 3 and showing the indexing cams in one position;

Fig. 7a is an enlarged plan view of the cams illustrating the extents of the various portions thereof;

Fig. 8 is a fragmentary view of the parts illustrated in Fig. 7 and showing the indexing cams in a different position;

Fig. 9 is a fragmentary view similar to Fig. 8 but showing the indexing cams in yet another position; and Fig. 10 is a fragmentary view similar to Figs. 8 and 9 but showing the indexing cams in a still different position.

Figures 3, 4:
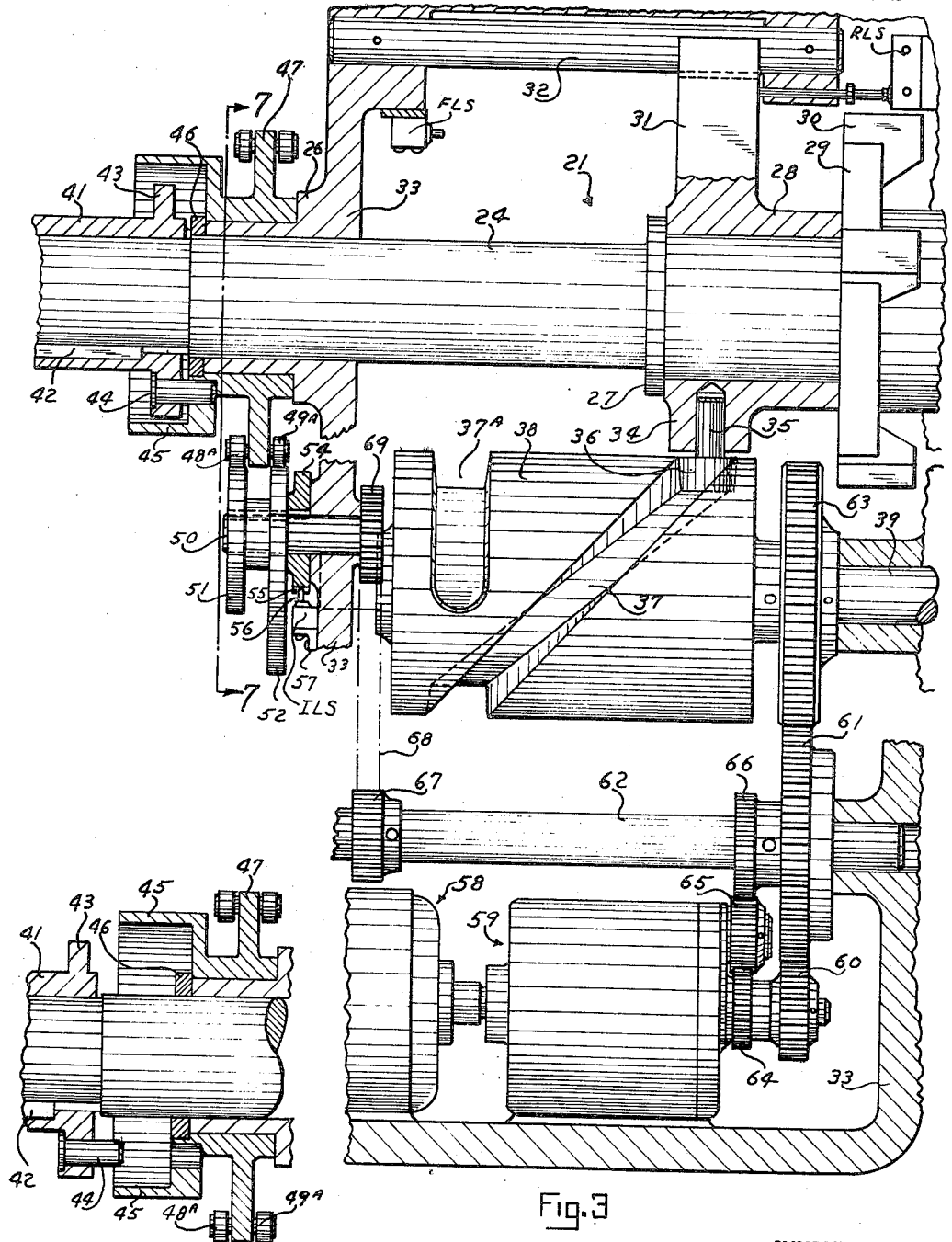
Fig. 3 is a sectional view taken through a portion of the machine tool illustrated in Fig. 1 and showing the means for indexing and reciprocating the tool support.
Fig. 4 is a fragmentary view of a portion of the mechanism of Fig. 3 illustrating the indexing mechanism in a different relationship.

In Fig. 1 of the drawings there is illustrated a portion of the headstock of a machine tool, generally designated H, in which is journalled a work (or tool) spindle 20 driven in the conventional manner (not illustrated). Disposed in parallel relationship with the spindle 20 is a tool (or work) support, designated generally 21, which is mounted in the headstock H for both reciprocating and indexing motions. The outer end of this tool (or work) support 21 comprises a multiple-sided tool (or work) supporting head, generally designated 22. In the illustrated embodiment, the head 22 is provided with five faces, each of which is provided with a dovetail projection 23, upon which a tool (or workpiece) may be mounted. While five such mounting means have been illustrated, it will be readily apparent that the number may be varied as desired. The tool (or work) support 21 further comprises a shaft 24 connected with the said tool (or work) supporting head 22, the shaft being reciprocably and rotatably journalled in the head H by bosses 25 and 26 (see also Fig. 3).

Turning now to Fig. 3, it will be seen that the shaft 24 is provided (intermediate its ends) with a shoulder 27, against which, and surrounding the shaft, is mounted a motion transmitting member 28. This member is retained against the shoulder 27 by means of a spider member 29, having a plurality of projecting lugs 30 thereon corresponding in number and spacing with the faces 23 on the tool (or work) head 22, the said spider being fixedly mounted upon the shaft 24 for rotation therewith. The motion transmitting member 28 is provided with an outwardly extending arm 31 having a forked outer end straddling a guide bar 32, the latter being fixedly mounted in the framework 33 of the headstock H. The motion transmitting member 28 is further provided with a boss 34, in which is rotatably mounted a pin or stud 35 having a roller 36 on its outer end. This roller 36 is received in a camming groove 37, provided in a cylindrical drum 38, the cam groove also having a dwell portion 37a at one end thereof. The drum 38 is fixedly mounted upon a shaft 39, which is rotatably journalled in suitable bosses provided in the frame 33 of the headstock H.

The cam drum 38 is rotatable in either direction for reciprocation of the member 28; clockwise rotation of the drum 38 moving the member 28 from the position shown in Fig. 3 to the left thereof until the roller 36 is in the dwell portion 37a, and counter-clockwise rotation of the said drum returning the member 28 to the position as illustrated in Fig. 3. The forked portion 31 and the bar 32 prevent rotation of the member 28 when so actuated. It will be apparent that when the cam 38 reciprocates the member 28, the shaft 24 of the tool support moves therewith and carries the spider 29 and the tool supporting head 22 as a unit.

As the spider 29 moves to the left, as seen in Fig. 3, one of the lugs 30 on the said spider will be positioned, in a manner subsequently to be described, to enter a longitudinally extending guideway 40 provided in the frame 33 (see Figs. 5 and 6), the outer end of this guideway 40 having its edges beveled or otherwise flared slightly to assist in guiding the lug 30 therein. This guideway 40 is provided for the purpose of preventing rocking motion of the shaft 24, and consequently the tools (or workpiece) carried thereby, during reciprocation in a machining operation.

The shaft 24 extends beyond the boss 26 and is provided on the extending portion with a sleeve 41, which is connected with the said shaft 24 by means of a key 42. The sleeve 41 has a flange 43, in which is mounted a pin or stud 44 having a projecting portion adapted to be received within an opening provided in an indexing member 45. The indexing member 45 is rotatably journalled upon a reduced portion of the boss 26 and retained against longitudinal movement thereon by a collar 46. The indexing member 45 is also provided with an integral indexing disk 47, on one face of which are mounted a plurality of equally spaced projections which are illustrated as studs and rollers 48A, 48B, 48C, 48D, and 48E (see Fig. 7) corresponding in number and spacing to the tool (or workpiece) supporting faces 23 on the tool supporting head 22. On the opposite face of said disk 47 are provided a plurality of projections which are here shown as studs and rollers 49A, 49B, 49C, 49D and 49E equal in number and spacing to the rollers 48A, 48B, 48C, 48D and 48E but circumferentially staggered with respect thereto.

A cam shaft 50 is journalled in the frame 33 below the indexing disk 47, the outer end of the shaft being provided with a pair of cam members 51 and 52 which are identical in shape but angularly displaced and oppositely disposed, the cams being connected for rotation with the shaft 50 by means of a key or keys 53. The periphery of the cam 51 cooperates with the aforementioned rollers 48A, 48B, 48C, 48D and 48E and the cam 52 cooperates with the rollers 49A, 49B, 49C, 49D, 49E, so that rotation of the shaft 50 will cause the disk 47 (and hence the tool supporting head 22) to be indexed and locked in an indexed position.

In Fig. 7a the cams 51 and 52 are shown disconnected from the other mechanism to illustrate more clearly the various portions or surfaces thereof. As will be seen in this figure, these cams each have an irregular periphery so as to form a plurality of camming and arcuate portions, or surfaces. Thus it will be noted that the cam 51 comprises a driving cam portion A, an arcuate portion B, a cam-shaped restraining or regulating portion C, and a driving portion E; the portions C and E being united by a notch portion D, having a curvature substantially equal to that of the rollers 48A, 48B, 48C, 48D and 48E, and the driving portion E being united with the driving portion A by an arcuate portion F having a smaller radius of curvature than the arcuate portion B. As indicated by the radial lines in Fig. 7A, the driving portion A and the two arcuate portions B and F each occupy 90° of arc of the cam, the remaining 90° of arc being divided between the portions C, D, and E. For ease in distinguishing the radial lines pertaining to the respective cams, the said lines for cam 51 have been made heavier than those pertaining to cam 52. It will also be observed that the cam 52 is identical in shape with the cam 51 but is oppositely disposed with respect thereto, so that the correspondingly shaped portions of the two cams have reverse functions, as will become apparent in a further description of the indexing operation. The several portions of cam 52 are indicated by reference characters A', B', C', D', E' and F', respectively.

As will be appreciated, the tools supported upon the several faces 23 of the tool head 22 will very likely have different weights so that the said tool head will have a tendency to gravitate to a position with the heavier tools at the bottom. In order to prevent such an occurrence, the cams 51 and 52 are so spaced on shaft 50 that they will co-act with the rollers 48A, 48B, 48C, 48D, 48E and 49A, 49B, 49C, 49D, 49E, respectively, of the indexing disk 47 so that the latter and the tool head will receive an indexing movement determined solely by the action of the said cams, and without interference from the unbalanced distribution of weight on the tool support. This is accomplished by virtue of the fact that, when one cam is in driving contact with a roller on one face of the disk, the next succeeding roller on the opposite face of the disk will ride upon a regulating or restraining surface on the other cam. Therefore, the disk (and hence the tool head) can be rotated only under control of the cams and cannot overrun, or otherwise independently rotate, under influence of unbalanced weight distribution on the tool head.

In Fig. 7, the indexing operation, caused by the rotation of the shaft 50, is just beginning. As the shaft 50 rotates the surface or portion A of cam 51 will drive the roller 48A and the disk 47 in a counter-clockwise direction, while the portion E' of cam 52 will ride in contact with roller 49A, thus controlling the motion of disk 47 and preventing overrunning. With continued rotation of shaft 50, the disk 47 (and consequently the tool support) will be moved under the control of the cams 51 and 52 to the position indicated in Fig. 8. At this time the roller 49A will have entered the notch D' on cam 52, thus momentarily taking over sole control of the disk 47, since at this instant the roller 48A will just be leaving contact with the driving surface or portion A of cam 51. Further rotation of shaft 50 now causes the surface or portion C' of cam 52 to take over the driving of disk 47, while the roller 48B will now ride upon the surface or portion C of cam 51 to regulate or restrain the advance of the indexing disk. This continues until the parts have reached the position shown in Fig. 9, at which time the roller 48B will have entered the notch D so that the cam 51 momentarily takes sole control of the indexing as the driving surface or portion C' is moved out of contact with roller 49A.

Continued rotation of the shaft 50 now causes the surface or portion E of cam 51 to drive the roller 48B, and hence disk 47, the motion being controlled by the riding of roller 49B upon the surface or portion A' of cam 52. This action continues until the parts have reached the position shown in Fig. 10, at which time the arcuate portion F of the cam 51 is in contact with the roller 48B, and the arcuate portion F' of cam 52 is in contact with the roller 49B. Therefore, continued rotation of the shaft 50, to the position shown in Fig. 7, produces no further indexing of the disk 47 and the tool support 21, since the rollers 48B and 49B are now riding upon the arcuate portions F and F', respectively, which have the same radius of curvature the center of which coincides with the axis of rotation of the cams. Hence, with the elements in the position shown in Fig. 7, a tool has been indexed into operative position for performing an operation upon a workpiece supported in the spindle 20, and is accurately retained in this position by the locking action exerted by the arcuate portions F and F' upon the rollers 48B and 49B. Simultaneously, the spider 29 will have been indexed so that one of its lugs 30 will be accurately aligned with the guideway 40 for entrance therein when the tool support is subsequently reciprocated.

In the previous description of the indexing operation, it will be observed that the cam shaft 50 has made a single complete revolution for one step of the indexing cycle. Obviously, this shaft must then remain at rest until indexing is to be effected again. This control of the rotation of shaft 50 is accomplished by electrical means governed by a switch operating disk 54, which is connected for rotation with the shaft 50, and is provided with a notch 55 corresponding to the aforementioned locked position of the indexing mechanism. Adjacent the periphery of the disk 54 is an electrical switch ILS which may be mounted by means of a bracket 57 or other suitable support upon the framework 33. The said switch ILS has an operating button 56, projecting therefrom and riding upon the periphery of the disk 54, the switch being provided with contacts which are operated by the button 56 for controlling the operation of the driving mechanism, as is more fully described in the copending application of Myron S. Curtis and Harry Schoepe, Serial No. 684,595, filed on July 18, 1946, and entitled "Machine Tool."

The power for effecting reciprocation and indexing of the tool support 21 is provided by a single reversible electrical motor 58, which has its armature shaft connected with a power transmission unit generally designated 59. This power transmission unit may take a variety of forms, but in its essential characteristics comprises a driving member, two driven members, and an electromagnetic means for selectively connecting one of the said driven members for rotation by the driving member. One of these driven members is provided with a gear 60 which meshes with a gear 61, rotatably journalled on a cross shaft 62 which is, in turn, journalled in the framework 33 of the headstock H. The gear 61 meshes with a gear 63 carried by, and connected to, the shaft 39 for the cam drum 38. Hence, when the gear 60 is driven by the motor 58 (through the transmission unit 59) the cam drum 38 will be rotated and thus reciprocate the tool support. Since the motor 58 is reversible, the cam drum 38 may be rotated in either direction.

The other driven member of the power transmission unit 59 is provided with a gear 64 which drives an intermediate gear 65 to rotate a gear 66 carried by, and connected to, the shaft 62. The shaft 62 also has a gear 67 fixed thereon and this latter gear is connected through a gearing, or chain, transmission 68 to a gear 69 which is fixedly mounted on the cam shaft 50. Hence, when the gear 64 is driven by the motor 58 (through the power transmission unit 59), the gears 65, 66, shaft 62 and gear 67 will be rotated thus causing the transmission 68 to rotate gear 69 and the cam shaft 50. When shaft 50 has made one revolution, the disk 54 operates switch ILS to deenergize the power transmission unit 59 thus stopping the rotation of cam shaft 50 and the cams 51 and 52 carried thereby. The gear 64, and hence the cams 51 and 52, can rotate in only one direction by virtue of suitable switches in the electrical control circuit for the motor 58 and the power transmission unit 59. The details of this power transmission unit, and of the electrical control circuit for this unit and motor 58, need not be set forth here since they do not form a part of this invention and are fully disclosed in the prior application mentioned above. Suffice it to say that the said transmission unit comprises electromagnetic means which are connected in a suitable electrical circuit so that, by the operation of switches in the latter, either the gear 60 or gear 64 may be connected with the motor 58 to effect driving of the reciprocating mechanism or of the indexing mechanism, respectively. The said unit further comprises means for holding one of said driven members from rotation when the other of said members is connected for rotation and, when neither is to be rotated, for positively holding both of the said driven members stationary. Also, limit switches FLS and RLS are provided within the housing 33 for actuation by the member 31 of the reciprocating mechanism to thereby break the electrical circuit controlling the motor and power transmission unit when the reciprocating mechanism has reached its extreme positions. This feature is also fully described in the previously mentioned copending application.

It will be observed that as the tool support 21 reciprocates the pin 44 carried by the flange 43 will move out of the cooperating hole in the indexing member 45 so that the indexing mechanism is disconnected from the tool support during the reciprocation thereof. During this motion, it will be remembered that one of the lugs 30 will move within the guideway 40, thus maintaining the pin 44 in alignment with the hole in the indexing member 45 so that, when the tool support is returned to its initial position (as shown in Fig. 2), the said pin 44 will re-enter the opening in the member 45, thus reconnecting the indexing mechanism with the tool support 21. In this position the lug 30 will have moved out of the guideway 40 so that the tool support may now be freely indexed in the manner previously described. The parts are so proportioned that the lug 30 will enter the guideway 40 before the pin 44 has completely left the opening in the member 45, and, conversely, the pin 44 will have entered the opening in the indexing member 45 before the lug 30 has completely left the guideway 40. This insures that the tool support 21 is at all times held against rotation due to the unbalanced condition caused by the tools mounted upon the head 22, since it will be remembered that (with the parts as shown in Figs. 2 and 7) the cams 51 and 52 cooperate with the rollers upon the indexing disk 47 to lock the latter against rotation due to the aforementioned unbalanced condition of the tool head.

It will now be apparent that my improved means for indexing the tool support provides a more accurate indexing, since the rotation of the support is under positive control at all times and the support is positively locked in its indexed position. Hence, the support is accurately indexed, and maintained in that indexed position, throughout an operative cycle regardless of the unbalanced distribution of weight on the tool head. While the improved indexing mechanism has been illustrated and described as employed for indexing a tool support for a machine tool it will be apparent that the invention is not limited to such a use but may be employed for actuating other indexible members.

Other and further advantages and objects of the invention will be readily apparent to one skilled in the art, and since numerous modifications may be made therein, I do not consider my invention as limited to the exact construction illustrated, but desire to cover all modifications and adaptations coming within the spirit and scope of the appended claims.

Having thus described my invention, I claim:

1. In an apparatus of the character described, a tool or work supporting head adapted to mount a plurality of tools or workpieces for successive machining operations, a rotatable shaft connected to said head, a rotatable disk provided with a plurality of spaced rollers on each of its faces, means connecting said disk to said shaft for rotation therewith, a pair of identically shaped and oppositely disposed cams rotatably mounted adjacent said disk for cooperation respectively with the rollers on the opposite faces of said disk, and means to simultaneously rotate said cams, the said cams having configurations such that one cam rotatively drives the disk while the other cam restrains the disk from rotation independent of said driving with the driving and restraining functions of the cams alternating, the said cams each including an arcuate surface thereon having the same radius of curvature the center of which coincides with the axis of rotation of the cams, the said arcuate surfaces simultaneously engaging adjacent rollers on opposite faces of said disk once during each revolution of the cams, whereby the head is intermittently rotatably indexed a predetermined amount for each revolution of the cams and locked in the indexed position, the rotational movement of the head being positively controlled at all times so that unbalanced distribution of the weight of the tools or workpieces mounted thereon does not interfere with the rotation or the locking of the head in an indexed position.

2. In an apparatus of the character described, a tool or work supporting head adapted to mount a plurality of tools or workpieces for successive machining operations, a shaft connected to said head, means mounting said shaft for axial movement and rotation, a disk provided with a plurality of spaced rollers on each of its faces, means to rotatably journal said disk coaxially with said shaft, means to selectively connect the disk to said shaft when the latter has been axially moved to a predetermined position, a pair of rotatable cams, means to rotate said cams simultaneously, the said cams being identically shaped but oppositely disposed and cooperating respectively with the rollers on the opposite faces of said disk, the said cams having configurations such that one cam rotatively drives the disk while the other cam regulates such rotation with the driving and regulating functions of the cams alternating, the said cams each including an arcuate surface thereon having the same radius of curvature the center of which coincides with the axis of rotation of the cams, the said arcuate surfaces simultaneously engaging adjacent rollers on opposite faces of said disk once during each revolution of the cams, whereby the head is intermittently rotatably indexed a predetermined amount for each revolution of the cams and locked in the indexed position, the rotational movement of the head being positively controlled at all times so that unbalanced distribution of the weight of the tools or workpieces mounted thereon does not interfere with the rotation or the locking of the head in an indexed position.

3. In an apparatus of the character described, a tool supporting head having a plurality of means spaced thereabout to mount a plurality of tools for successive machining operations upon a workpiece, a rotatable shaft connected to said head, a rotatable disk provided with a plurality of spaced rollers on each of its faces, the rollers on each face of said disk corresponding in number and spacing with the number and spacing of the tool mounting means on said head, means connecting the disk to said shaft for rotation therewith, a pair of identically shaped and oppositely disposed cams rotatably mounted adjacent said disk to cooperate respectively with the rollers on the opposite faces of said disk, and means to simultaneously rotate said cams, the cams being so shaped that one cam rotatively drives the disk while the other cam restrains the disk from rotation independent of said driving with the driving and restraining functions of the cams alternating during one complete revolution thereof to rotate the said disk and shaft an amount sufficient to index a tool on said head out of, and the next succeeding tool into, operative position with respect to the workpiece, the said cams each including an arcuate surface thereon having the same radius of curvature the center of which coincides with the axis of rotation of the cams, the said arcuate surfaces simultaneously engaging adjacent rollers on opposite faces of said disk at the completion of each complete revolution of said cams to thereby locate and lock the disk and shaft in an indexed position.

4. An apparatus as defined in claim 3 and further comprising means to reciprocate said shaft and tool supporting head, the said means connecting the disk to the shaft including a member connected with said shaft for rotation and axial movement therewith, the said member being adapted to be engaged with the said disk when the shaft is axially moved to a predetermined position and to be disengaged therefrom when the shaft is axially moved from said predetermined position.

5. In an apparatus of the character described, a tool supporting head having a plurality of means spaced thereabout to mount a plurality of tools for successive machining operations upon a workpiece, a rotatable shaft connected to said head, a disk connected to said shaft for rotation therewith, a plurality of spaced rollers journalled on each face of said disk, the rollers on each face corresponding in number and spacing with the number and spacing of the tool mounting means on said head, the rollers on one face of the disk being staggered with respect to the rollers on the other face of the disk, a pair of cams rotatably mounted adjacent said disk and adapted to cooperate respectively with the rollers on the opposite faces of the disk, the said cams being identical in shape but oppositely disposed and rotatively displaced relative to each other, and means to simultaneously rotate said cams, the surfaces of the cams including disk-driving and disk-restraining surfaces thereon so positioned that when the driving surface of one cam is in contact with one of said rollers the next succeeding roller on the opposite face of the disk will ride in contact with the disk-restraining surface of the other cam, the said cams each also including an arcuate surface thereon having the same radius of curvature the center of which coincides with the axis of rotation of the cams, the said arcuate surfaces simultaneously engaging adjacent rollers on opposite faces of said disk once during each revolution of the cams, whereby the said tool supporting head is intermittently rotatably indexed a predetermined amount for each revolution of the cams and rotational movement of the head is positively controlled at all times so that unbalanced distribution of the weight of the tools mounted thereon does not interfere with the rotation, the said arcuate surfaces locking the disk and shaft from rotation when a tool on said head has been indexed for a machining operation.

6. An apparatus as defined in claim 5 wherein each of the cams further includes a notched portion, the notch of each cam receiving one of the cooperating rollers on the disk during the transition between the disk-driving and disk-restraining operations of the other cam.

7. An indexing mechanism for an indexible tool support of a machine tool comprising, a disk connected to rotate with said tool support; a plurality of spaced rollers journalled on each face of said disk, the rollers on each face corresponding in number and spacing with the indexible positions of said support, the rollers on one face of the disk being staggered with respect to the rollers on the other face of the disk; a pair of cams rotatably mounted adjacent said disk and adapted to cooperate respectively with the rollers on the opposite faces of the disk; one of said cams comprising a first disk-driving surface and a disk-restraining surface separated by an arcuate surface, and a second disk-driving surface separated from the said disk-restraining surface by a notch and from said first disk-driving surface by a second arcuate surface; the other of said cams comprising a first disk-restraining surface and a disk-driving surface separated by a notch, and a second disk-restraining surface separated from the disk-driving surface by a first arcuate surface and from the first disk-restraining surface by a second arcuate surface; and means to simultaneously rotate said cams through one revolution; whereby a driving surface of one cam will engage a roller on one face of said disk to rotate the latter and the tool support while a roller on the other face of said disk will ride in contact with a restraining surface on the other of said cams to regulate the rate of rotation of the tool support, the cams alternating in their driving and restraining operations, and the notch in each cam receiving one of said rollers for controlling the rotation during the transition of the other cam from driving to restraining operation.

8. An apparatus as defined in claim 7 wherein the cams are so positioned upon their rotatable mounting that at the completion of each revolution thereof one of the said arcuate surfaces of each cam is located between adjacent rollers on the opposite faces of the disk, each cam in contact with its cooperating roller, whereby the disk and tool support are locked in an indexed position.

9. An apparatus of the character described comprising an indexible member provided with a plurality of spaced projections on opposite sides thereof, a pair of identically shaped and oppositely disposed cams rotatably mounted adjacent said member for cooperation respectively with the projections on the opposite sides of said member, and means to simultaneously rotate said cams, the said cams each including driving and restraining surfaces sequentially engaging the said projections so that one cam drives said member with an indexing movement while the other cam restrains said member from overrunning, said cams each also including an arcuate surface thereon having the same radius of curvature the center of which coincides with the axis of rotation of the cams, the said arcuate surfaces simultaneously engaging adjacent projections on opposite sides of said member once during each revolution of the cams to lock said member from rotation after it has been indexed to a predetermined position by the action of said driving and restraining surfaces.

10. An indexing mechanism for a machine tool comprising a rotatable disk provided with a plurality of spaced rollers on each of its faces, a pair of identically shaped and oppositely disposed cams rotatably mounted adjacent said disk upon a common axis for cooperation respectively with the rollers on the opposite sides of said disk, and means to simultaneously rotate said cams, said cams each including disk-driving and disk-restraining surfaces sequentially engaging the said projections so that one cam drives said disk with an indexing movement while the other cam restrains said disk from overrunning, the said cams each also including an arcuate surface thereon having the same radius of curvature the center of which coincides with the axis of rotation of the cams, the said arcuate surfaces simultaneously engaging adjacent rollers on opposite faces of said disk once during each revolution of the cams thus locking the disk in the position to which it has been indexed by the action of said driving and restraining surfaces.

11. A machine tool of the character described comprising an indexible member provided with a plurality of spaced projections on opposite sides thereof, a pair of cams rotatably mounted adjacent said member upon a common axis and adapted to cooperate respectively with the projections on the opposite sides of said member, the said cams being identical in shape but oppositely disposed and rotatably displaced relative to each other, and means to simultaneously rotate said cams, the peripheries of the cams including driving and restraining surfaces thereon so positioned that the driving surface of one cam is in contact with one of said projections at the same time that the next succeeding projection on the opposite side of said member is in contact with the restraining surface of the other cam so that rotatable indexing of said member is positively controlled at all times, the said cams each also including an arcuate surface thereon having the same radius of curvature the center of which coincides with the axis of rotation of the cams, the said arcuate surfaces simultaneously engaging adjacent projections on the opposite sides of said member once during each revolution of the cams thereby locking the member in the position to which it has been indexed by the action of said driving and restraining surfaces.

MYRON S. CURTIS.

REFERENCES CITED

The following references are of record in the file of this patent:

UNITED STATES PATENTS

| Number | Name | Date |
|---|---|---|
| 527,552 | Hamann | Oct. 16, 1894 |
| 554,812 | Clyne | Feb. 18, 1896 |
| 1,083,987 | Chapman | Jan. 13, 1914 |
| 2,357,428 | Ruppel | Sept. 5, 1944 |